United States Patent Office

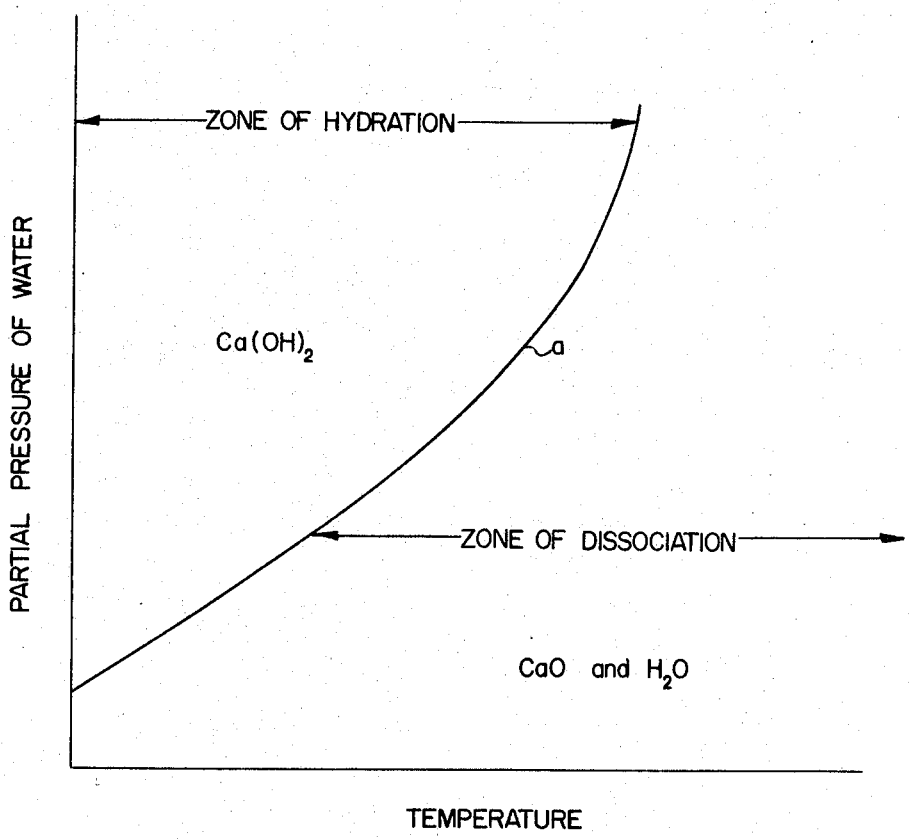

3,310,618
Patented Mar. 21, 1967

3,310,618
METHOD OF MANUFACTURING BASIC
REFRACTORIES
Samuel Rusoff, Tiffin, Ohio, assignor to Basic Incorporated, Cleveland, Ohio, a corporation of Ohio
Filed June 28, 1965, Ser. No. 480,235
5 Claims. (Cl. 264—63)

This application is a continuation-in-part of Ser. No. 192,851, filed May 7, 1962.

The present invention relates to a ceramic bonded refractory and, more particularly, to such a refractory of basic particles, such as dead-burned dolomite which may also contain some free lime, held in integral relation one to anotther by a ceramic bond formed at elevated temperatures.

Bonded refractory articles have previously been produced by admixing dead-burned refractory particles with coal-tar pitch used alone or with certain additives, shaping the admixture into a desired form, and then firing the shaped form. During the firing, as the temperature of the shaped form passes through a zone, for instance a zone of about 500° F. to about 1800° F., the coal tar pitch is cracked or "coked" by pyrolytic reactions such as those taking place in cracking towers for petroleum or as occur in the manufacture of carbon electrodes which also have an initial binder of coal tar pitch. The pyrolytic reactions cause the pitch to decompose into a light volatile fraction which distills off leaving a residual carbon skeleton which binds the particles into an integral mass. Although coal tar pitch is widely used for this application, other carbonaceous substances, such as molasses and dextrin, which pyrolytically decompose to leave a residue of carbon may also be employed.

Often a dead-burned refractory, such as dead-burned dolomite or dead-burned magnesite, contains free lime. As used here and in the claims "free lime" is taken to mean calcium oxide present as such and not chemically combined with any other material. This free lime is very susceptible to hydration to form calcium hydroxide. The presence of calcium hydroxide is objectionable principally because lime swells upon hydration to such an extent that the increased volume is sufficient to fracture a shaped article such as a brick.

In order to prevent the hydration of free lime in an environment as here contemplated, it has been proposed to prepare refractory shapes by a so-called "flash firing" technique. In this approach, intense firing raises the temperature of a refractory shape so quickly that substantial hydration of free lime does not have an opportunity to take place. For example, as disclosed in U.S. Patent 2,971,240, the flash firing should raise the temperature of the refractory shape to at least 1000° F. within no more than five minutes.

The flash firing method is not economically attractive, especially on a large production basis, since large and rapid fluctuations in the temperature of the furnace itself are obviously essential.

In accordance with the present development, it is possible to eliminate entirely the use of such a carbonaceous substance and to employ rather a fugitive, temporary binder. Instead of pyrolytically decomposing during the firing operation, the present binder is cleanly distilled away and a ceramic bond is formed between and from the material defining the dead-burned particles.

It is, therefore, a principal object to provide a method of forming a ceramic bonded refractory and resulting article.

Another object is to provide a fugitive temporary binder which is non-susceptible to pyrolytic decomposition but distills away during a firing operation leaving the particles free to form their own bond.

A further object is to provide a method for forming a refractory article from basic refractories such as deadburned dolomitic particles employing a non-pyrolytically decomposable temporary binder and resulting in such particles being held in an integral mass by a ceramic binder.

A still further object is to provide a method for forming a refractory body from basic refractory particles containing free lime by use of a distillable, non-pyrolytically decomposable temporary binder in which a relatively slow firing schedule is used to distill the temporary binder from the refractory and to provide a protective vapor barrier against hydration.

Other objects will be apparent as the description proceeds.

To the accomplishment of the foregoing and related ends, the invention consists of the features hereinafter fully described and particularly pointed out in the claims, the following disclosure describing in detail the invention, such disclosure illustrating, however, but one or more of the various ways in which the invention may be practiced.

In carrying out the present invention, basic refractory particles which may contain some free lime are admixed with a distillable, water-free organic material which is non-susceptible to pyrolytic decomposition. The admixture is shaped, preferably under pressure, and the shaped admixture is then heated to distill off the organic material and promote a ceramic bond between and among the refractory particles. Naphthalenes, chlorinated naphthalenes, and anthracenes may be used as the described organic material, but waxes are preferred.

The concept of the present invention can perhaps be better understood from a consideration of the graph of FIGURE 1. This graph illustrates the relation between lime and water as the temperature and pressure (plotted as the partial pressure of water) are varied. Under temperature and pressure conditions lying to the left and above curve $a$, lime and water react (hydration) to form calcium hydroxide. This area therefore may be termed a "Zone of Hydration." Hydration, which is so objectionable for the reasons preivously noted, is the usual situatiton due to the relatively low temperatures and pressures normally extant in the initial stages of preparing a shaped refractory.

However, under temperature and pressure conditions lying to the right and below curve $a$, lime and water do not react but retain their separate chemical entities. This area therefore may be termed the "Zone of Dissociation." On the curve $a$, there is an equilibrium in the hydration reaction of lime, and accordingly calcium hydroxide, lime, and water are all present at conditions lying on this curve. In accordance with the flash firing technique of U.S. Patent No. 2,971,240 previously referred to, the temperature to the right of curve $a$ is reached so quickly that hydration of free lime may be effectively prevented.

In accordance with the present invention, however, the temperature of the refractory is increased relatively slowly and as heat begins to penetrate the refractory body, vapors of the defined distillable water-free organic compound form to create a positive pressure within the refractory shape. As the heating continues and the temperature of the refractory shape relatively slowly passes through the Zone of Hydration, the distilled essentially hydrocarbon vapors seep outwardly through the porous refractory acting as a protective gaseous barrier or blanket. The distilled vapors do not react with the free lime or refractory particles and because of their outward flow, water vapors cannot enter the refractory and hydrate the free lime. When the temperature reaches a value lying to the right of graph a, lime and water will not react as previously noted and the danger of hydration is then passed. Thereafter, continued heating and firing of the refractory particles forms a ceramic bond among them.

While the presence of any free lime is detrimental and may be successfully inhibited from hydrating by the present invention, usually free lime constitutes about five percent or more by weight of the refractory shape. The temperature range within which the preferred waxes readily distill and therefore afford the greatest protection is about 275° F. to about 500° F.

The basic refractory particles usually comprise dead-burned particles such as dead-burned dolomite and/or magnesia or mixtures thereof, although other basic refractory particles may also be used. Desirably, the dead-burned particles contain a major portion of dead-burned dolomite and preferably at least 50 percent by weight of dead-burned dolomite. The particles may be prepared by calcining naturally occurring ores such as dolomite, magnesite, and the like. An example of such a naturally occurring ore is the Niagaran dolomite quarried in northern Ohio. The calcining may take place in a conventional type of kiln which may be either a shaft or rotary kiln.

The feed material to the kiln may be the previously mentioned naturally occurring ores in a granular form to which small additions of fluxing agents are added such as iron oxide, alumina, silica or clay if such be desired. The dead-burned refractory material is crushed to a desired size or a range of sizes depending on the density and other physical attributes required in the finished product, as is well known in the art. The particle sizes are not at all critical to the invention, and as indicated various ranges of particle sizes are actually often used for a given product, such as a brick, as illustrated by the accompanying examples.

The crushed and sized dead-burned refractory particles are then admixed with a non-pyrolytically decomposable fugitive binder. As indicated waxes are preferred for this ingredient and can be used as long as they are not subject to coking at elevated temperatures but do distill away leaving little or no trace. Some residue is permissible. Ordinarily beeswax, chlorinated waxes, or carnauba wax, for instance, may be used. However, the preferred wax is a petroleum wax. There are two general types of petroleum waxes which are most satisfactory for the present purpose. These two types are:

(1) Paraffin waxes such as those produced in the United States from Appalachian and Mid-Continent crude oils. In the fully refined state the commercial grades of these paraffin waxes have softening points within the range of about 118° F. to about 155° F., as measured by the A.S.T.M. method of test D87–57. We have found that those paraffin waxes having softening points in the range of about 123° F. to about 131° F. to be most suitable, though commercial grades of lower or higher softening points can be used satisfactorily, and (2) Microcrystalline waxes such as those obtained as a by-product in the dewaxing of motor oil distillates from residual oils, and from the settlings or "bottoms" withdrawn from crude oil storage tanks. Such waxes are characterized by their inherent solidification in the form of very small ("micro") malformed indistinct crystals. The microcrystalline waxes in comparison with the paraffin waxes have higher melting points, higher degrees of cohesion and adhesion, higher flexibilities and pliabilities. They have softening points within the range of about 145° F. to about 196° F. as measured by the A.S.T.M. method of test D127–60. We have found that microcrystalline waxes ranging in softening points from about 150° F. to about 165° F. to be most suitable. Commercial grades of lower and higher softening points are also satisfactory.

In accordance with the accepted practice of both manufacturers and users, the paraffin and microcrystalline waxes have been specified only by the temperature ranges in which they soften, using the mentioned A.S.T.M. methods of tests. In the claims, the term "petroleum wax" is taken to mean paraffin and microcrystalline waxes of the types just described. Similarly, the terms "paraffin waxes" and "microcrystalline waxes" refer to the corresponding waxes just described. Blends of paraffin waxes and microcrystalline waxes are also quite satisfactory for the described purpose. Blends have been used ranging from about 25 percent to about 75 percent paraffin wax to about 75 percent to about 25 percent of microcrystalline wax.

The wax is admixed with the dead-burned refractory particles in an amount of about two percent to about ten percent by weight of the particles. Less than two percent does not provide sufficient binding action (that is, the refractory shape does not have sufficient mass integrity) while more than ten percent results in unnecessary waste. The wax is heated at least to its softening point and preferably to a liquid state so that the wax and particles can be homogeneously blended. The wax may be heated prior to admixture with the dead-burned particles, or the admixture itself can be heated. The hot mix is then shaped as desired, for example, in the form of a brick. The shaping may be accomplished by a suitable hydraulic or mechanical press. The wax acts as a lubricant at this juncture enabling the admixture to be densified to a desired degree.

After the pressing or shaping step, the wax sufficiently binds the dead-burned particles one to another to permit the shaped article to be further handled, as for transporting to the kiln and during the initial stages of firing. During this heating step, the wax distills away cleanly to provide the described vapor barrier; and subsequently at higher temperatures the particles are fused or sintered together to provide a ceramic bonding action effective to impart the requisite mass integrity to the final product.

As indicated previously, the refractories are fired at a relatively slow rate to disill the temporary binder and to provide the protective vapor barrier. To achieve such distillation the refractories are brought from room temperature (about 65° F. to 75° F.) to a temperature of about 2600° F. to 3200° F. in about four to six or seven hours with a substantially uniform temperature rise per hour. The complete firing schedule normally includes a holding period of several hours at the elevated temperature. Since the temporary binders distill at relatively low temperatures, the slow heating will cause such material to be vaporized but retained within the refractory and thus prevent water vapor from permeating the refractory until the temperature has become sufficiently high that the lime and water will not react but will retain their separate chemical entities.

In order to demonstrate the invention, the following examples are set forth for the purpose of illustration only. Any specific enumeration or detail mentioned should not be interpreted as a limitation of the invention unless specified as such in one or more of the appended claims and then only in such claim or claims.

EXAMPLE 1

A dead-burned dolomite was prepared having this analysis in weight percent:

*Chemical analysis*

| | Percent |
|---|---|
| Ignition loss | 0.68 |
| $SiO_2$ | 1.09 |
| $Fe_2O_3$ | 5.70 |
| $Al_2O_3$ | 0.63 |
| CaO | 54.90 |
| MgO | 37.54 |

Screen analysis

Mesh:
| | Percent |
|---|---|
| +6 | 0.0 |
| −6 +8 | 10.6 |
| −8 +10 | 25.8 |
| −10 +14 | 28.3 |
| −14 +20 | 19.0 |
| −20 +48 | 15.7 |
| −48 | 0.6 |

Bulk density _____ g./cc__ 3.095

A batch was formulated consisting essentially of paraffin wax and the dead-burned dolomite just described having particle sizes as follows in weight percent:

Formulation

| | Percent |
|---|---|
| Dead-burned dolomite, −6 mesh | 65 |
| Dead-burned dolomite, 65% −200 mesh | 35 |
| Paraffin wax (added) | 10 |

In accordance with accepted practice, here and in the other examples the minus sign is taken to mean passing the indicated mesh size, while the plus sign is taken to mean being retained on the indicated mesh size. Also the addition of wax is based on the weight of the other ingredients of the formulation.

The dead-burned dolomite and wax of this formulation were admixed and then heated to a temperature just sufficient to melt the wax. The formulation was then thoroughly mixed and specimens prepared therefrom at a pressure of five tons per square inch. The specimens were cylinders measuring three and one-half inches in diameter and two inches in height. These specimens were fired from room temperature to 2900° F. in four hours and subsequently found to have a density of about 3.2 grams per cubic centimeter.

EXAMPLE 2

Dolomite was dead-burned in a rotary kiln to obtain a dead-burned product having this analysis in weight percent:

Chemical analysis

| | Percent |
|---|---|
| Ignition loss | 0.39 |
| $SiO_2$ | 1.08 |
| $Fe_2O_3$ | 0.26 |
| $Al_2O_3$ | 0.66 |
| CaO | 59.11 |
| MgO | 37.94 |

The resulting clinker was crushed to −6 mesh and sized into three fractions with the following screen analyses:

−6 +20 mesh:
| | Percent |
|---|---|
| +5 | 0.0 |
| −5 +8 | 29.2 |
| −8 +10 | 31.7 |
| −10 +14 | 22.8 |
| −14 +20 | 15.1 |
| −20 | 1.2 |

−20 mesh:
| | |
|---|---|
| +14 | 0.4 |
| −14+20 | 1.3 |
| −20 +28 | 29.7 |
| −28 +48 | 36.9 |
| −48 +100 | 18.0 |
| −100 +200 | 7.7 |
| −200 | 6.0 |

65% −200 mesh:
| | |
|---|---|
| +48 | 0.3 |
| −48 +100 | 3.6 |
| −100 +200 | 28.7 |
| −200 | 67.4 |

Bulk density _____ g./cc__ 3.1375

A batch was formulated from a wax and this crushed and sized clinker having the indicated particle sizes present in the following weight percent:

Formulation

| | Percent |
|---|---|
| −6 +20 mesh | 60 |
| −20 mesh | 10 |
| 65% −200 mesh | 30 |
| Paraffin wax (added) | 4 |

The wax used was an Appalachian fully refined paraffin wax of a melting point range of 122° F. to 124° F. (A.S.T.M. D87–42) and of finely crystalline texture. The dead-burned particles of the formulation were warmed to approximately 150° F. when the wax in liquid form was added to the particles and thoroughly mixed. Specimen bars measuring seven inches by two inches by one inch were pressed at 5 tons per square inch. Data obtained upon firing the bars to 3000° F. in about six hours were as follows:

Linear shrinkage upon firing to 2900° F. __percent__ 1.35
Linear shrinkage upon firing to 3200° F. __do____ 2.50
Pressed density (before firing) _____g./cc__ 2.80
Fired density after firing to 3200° F. _____g./cc__ 3.03

EXAMPLE 3

A dead-burned dolomite clinker was prepared, of which the chemical analysis was in weight percent as follows:

Chemical analysis

| | Percent |
|---|---|
| Ignition loss | 0.04 |
| $SiO_2$ | 2.76 |
| $Fe_2O_3$ | 0.45 |
| FeO | 0.27 |
| $Al_2O_3$ | 0.73 |
| CaO | 54.61 |
| MgO | 41.27 |

The fired clinker was crushed to −6 mesh and sized into three fractions having the following screen analyses:

−6 +20 mesh:
| | Percent |
|---|---|
| +6 | 0.3 |
| −6 +8 | 23.1 |
| −8 +10 | 27.9 |
| −10 +14 | 26.0 |
| −14 +20 | 20.3 |
| −20 | 2.4 |

−20 mesh:
| | |
|---|---|
| +20 | 1.5 |
| −20 +48 | 61.0 |
| −48 +100 | 20.3 |
| −100 +200 | 10.0 |
| −200 | 7.2 |

65% −200 mesh:
| | |
|---|---|
| +48 | 1.0 |
| −48 +100 | 9.1 |
| −100 +200 | 25.8 |
| −200 | 64.1 |

Two sets of brick were prepared having the following size distribution and mixed with a microcrystalline wax in the indicated proportions by weight percent:

|  | Brick A, percent | Brick B, percent |
| --- | --- | --- |
| −6+20 Mesh | 70.0 | 60.0 |
| −20 Mesh |  | 10.0 |
| 65% −200 Mesh | 30.0 | 30.0 |
| Microcrystalline wax (added) | 7.8 | 7.8 |

The mixture was thoroughly blended in each case and bricks measuring nine inches by six inches by three to three and one-half inches were then pressed from each formulation at five tons per square inch. The bricks were fired to 2800° F. in a gas-fired downdraft kiln. The firing schedule covered a period of six and one-half hours to 2800° F. and a holding period of four hours at that temperature. The fired brick had these physical properties:

|  | Brick A | Brick B |
| --- | --- | --- |
| Pressed density (prior to firing), g./cc | 2.69 | 2.70 |
| Fired density after firing to 2,800° F. g./cc | 2.78 | 2.83 |
| Linear shrinkage during firing to 2,800° F., percent | 0.14 | 0.14 |
| Reheat shrinkage during firing to 2,900° F., percent | 0.50 | 0.84 |
| Crushing strength of fired brick, p.s.i | 4,765 | 5,098 |

EXAMPLE 4

A dead-burned dolomite clinker was used having the following chemical analysis in weight percent.

|  | Percent |
| --- | --- |
| Ignition loss | 0.39 |
| SiO$_2$ | 1.08 |
| Fe$_2$O$_3$ | 0.26 |
| Al$_2$O$_3$ | 0.66 |
| CaO | 59.11 |
| MgO | 37.94 |

One portion of the dolomite clinker was crushed to pass a 6 mesh sieve and another portion was ground so that 65% of the ground product passed through a 200 mesh sieve. The two sized products were warmed and blended with melted paraffin wax in this size and weight distribution.

|  | Percent |
| --- | --- |
| −6 mesh dolomite clinker | 65 |
| 65% −200 mesh dolomite clinker | 35 |
| Paraffin wax (added) | 10 |

Cylindrical specimens were then pressed from this formulation at five tons per square inch into a size measuring three and one-half inches in diameter and two inches in height. The specimens were fired to 2900° F. in six hours. The ceramic bonded pieces withstood handling and firing to this temperature. Furthermore, they were quite refractory due to the absence of any undue amounts of fluxes.

EXAMPLE 5

Crushed and sized dead-burned dolomite clinker was heated overnight at 265° F. prior to adding a molten temporary wax binder consisting essentially of a microcrystalline wax. The admixture had this size and weight distribution:

*Formulation*

|  | Percent |
| --- | --- |
| −5 +20 mesh low flux dolomite | 70 |
| Ball-milled fine low flux dolomite | 30 |
| Molten wax (added) | 4 |

*Screen analyses*

| −5 +20 mesh fraction: | Percent |
| --- | --- |
| +4 | 0.0 |
| +5 | 0.6 |
| +6 | 14.9 |
| +8 | 37.0 |
| +10 | 25.7 |
| +14 | 15.7 |
| +20 | 5.4 |
| +48 | 0.3 |
| +100 | 0.1 |
| −100 | 0.3 |

| Ball-milled fines, mesh: |  |
| --- | --- |
| +48 | 0.1 |
| +100 | 7.1 |
| +150 | 13.1 |
| +200 | 13.8 |
| −200 | 65.9 |

The formulation was pressed at five tons per square inch into the form of brick measuring nine inches by six inches by three to three and one-half inches. The brick were stacked in four groups consisting of one course high, two courses high, and four courses high. The brick were then fired to 2732° F. in a downdraft kiln in approximately six hours, and the firing was completed in about 24 hours. The brick did not deform execssively during this operation. All brick exhibited good mass integrity and refractoriness.

Samples of the fired brick gave the following analyses in weight percent:

|  | Percent |
| --- | --- |
| Loss on ignition | 0.28 |
| SiO$_2$ | 1.20 |
| Fe$_2$O$_3$ | 0.24 |
| Al$_2$O$_3$ | 1.12 |
| CaO | 56.95 |
| MgO | 40.34 |

Other forms embodying the features of the invention may be employed, change being made as regards the features herein disclosed, provided those stated by any of the following claims or the equivalent or such features be employed.

I therefore particularly point out and distinctly claim as my invention:

1. A method of preparing refractory articles comprising admixing basic refractory particles containing free lime with a distillable, water-free organic binder non-susceptible to pyrolytic decomposition selected from the group consisting of waxes, naphthalenes, chlorinated naphthalenes, and anthracenes, shaping such admixture, heating said shaped admixture at a rate sufficient to raise the temperature from about room temperature to about 2600° F. to 3200° F. in about 4 to about 6 hours to distill said organic binder from said admixture and to provide a vapor barrier against hydration within said shaped refractory, and subsequently further heating said shaped refractory to form a ceramic bond among the refractory particles.

2. The method of claim 1 in which from about 2 to about 10 percent by weight, based on said refractory particles, of said organic binder is admixed with said refractory particles.

3. The method of claim 1 in which the subsequent heating of said shaped refractory is at a temperature of about 2600 to about 3200° F.

4. A method of preparing refractory articles comprising admixing basic refractory particles containing at least 5 weight percent free lime selected from the group consisting of dead-burned dolomite and magnesia with from about 2 to about 10 percent by weight, based on said particles, of a distillable, water-free organic binder non-susceptible to pyrolytic decomposition selected from the group consisting of waxes, naphthalenes, chlorinated naphthalenes, and anthracenes, shaping such admixture, heating said shaped admixture at a rate sufficient to raise the temperature from room temperature to about 2600 to about 3200° F. in about 4 to about 6 hours with a substantially uniform temperature rise per hour to distill said organic binder from said admixture and to provide a vapor barrier against hydration within said shaped refractory, and subsequently heating said shaped refractory at a temperature of about 2600 to 3200° F. to form a ceramic bond among the refractory particles.

5. The method of claim 1 in which said shaped admixture is heated from room temperature to about 2600° F. to 3200° F. with a substantially uniform temperature rise per hour.

References Cited by the Examiner
UNITED STATES PATENTS

| | | | |
|---|---|---|---|
| 3,015,850 | 1/1962 | Rusoff et al. | 264—620 |
| 3,070,449 | 12/1962 | Davies et al. | |
| 3,108,860 | 10/1963 | Davies et al. | 264—64 |

ROBERT F. WHITE, *Primary Examiner.*

J. A. FINLAYSON, *Assistant Examiner.*